United States Patent [19]

Kress et al.

[11] Patent Number: 4,571,130
[45] Date of Patent: Feb. 18, 1986

[54] REAMER WITH SELF LOCKING GUIDE MEMBERS

[75] Inventors: Dieter Kress, Aalen; Friedrich Häberle, Lauchheim, both of Fed. Rep. of Germany

[73] Assignee: MAPAL Fabrik für Präzisionswerkzeuge, Dr. Kress KG, Aalen, Fed. Rep. of Germany

[21] Appl. No.: 582,932

[22] Filed: Feb. 23, 1984

[30] Foreign Application Priority Data

Mar. 2, 1983 [DE] Fed. Rep. of Germany ....... 3307398

[51] Int. Cl.⁴ ...................... B23B 51/00; B23D 77/02
[52] U.S. Cl. ..................................... 408/143; 408/83; 408/199
[58] Field of Search ...................... 279/97; 408/79, 80, 408/83, 188, 232, 238, 239, 143

[56] References Cited

U.S. PATENT DOCUMENTS

| | | | |
|---|---|---|---|
| 1,300,325 | 4/1919 | Baumann | 408/143 X |
| 2,380,517 | 7/1945 | Gordon | 408/143 |
| 3,658,434 | 4/1972 | Benjamin et al. | 408/83 X |

Primary Examiner—Eugene F. Desmond
Attorney, Agent, or Firm—Erwin S. Teltscher

[57] ABSTRACT

A guide member is removably, but self lockingly, mounted on a cutter head. The cutter head has a dovetailed recess which receives the guide member. One side of the recess has bores which accommodate elastic elements which protrude into the recess. Friction coupling between the guide member and the elastic elements prevents axial movement of the guide member.

8 Claims, 3 Drawing Figures

REAMER WITH SELF LOCKING GUIDE MEMBERS

FIELD OF THE INVENTION

The present invention relates to reamers, and, more particularly, to reamers in which a guide member which extends approximately parallel to the axis of the cutter head is removably mounted at the periphery of the latter.

BACKGROUND OF THE INVENTION

In conventional reamers of this type, the guide member is fastened to the cutter head by means of a setscrew which is received in a recess in the cutter head. In this arrangement, the smoothing effect exerted by the guide members on the wall of the bore is decreased by the accummulation of splinters in the recess which accommodates the head of the setscrew. Since the guide members are relatively thin in a radial direction, the danger also exists that the cross section of the guide member will be sufficiently weakened to allow them to bend in the region of the setscrew. Such bending would of course also result in improper abutment of the guide member on the wall of the bore.

SUMMARY OF THE INVENTION

An arrangement of cylindrical guide members having a radius of curvature smaller than the radius of the bore of the wall being reamed, so that the axial crest lines of the guide members describe a predetermined circle of rotation, can be achieved by providing recesses in the cutter head which have a dovetailed cross section and into which the guide members are inserted through the front face of the cutter head. This, in itself, would not necessarily result in an exact positioning of the guide member in an axial direction. Further, the danger would exist, that when the reamer is withdrawn from the bore, friction between the bore and the guide members would cause the latter to be retained in the reamed bore.

The above difficulties are avoided by securing the guide members from movement in the axial direction, as well in the radial direction, of the cutter head. Thus, in accordance with the present invention, the cutter head has an elongated recess extending in the direction parallel to its axis which receives the guide member. The cross sectional shape of the recess assures radial self locking, while axial self locking is achieved by the use of elastic elements in the cutter head which protrude through at least one lateral side of the recess to provide friction coupling between the cutter head and the guide member after the latter is inserted in the former. These elastic elements are preferably arranged in radial planes of the cutter head. The elastic elements are preferably cylindrical in shape and are inserted into bores in the cutter head.

The novel features which are considered as characteristics for the invention are set forth in particular in the appended claims. The invention itself, however, both as to its construction and its method of operation, together with additional objects and advantages thereof will best be understood from the following description of specific embodiments when read in connection with the accompanying drawing.

FIG. 1 is a front view of the cutter head of the reamers;

FIG. 2 is a side view of the cutter head; and

FIG. 3 is an enlarged cross sectional view of a guide member.

BRIEF DESCRIPTION OF THE DRAWING

The present invention will be descirbed in relation to a single bit reamer. Two guide members 1 are inserted in prismatic recesses 2 of cutter head 3. The cross section of guide members 1 is trapezoidal with two lateral surfaces 11 and a cylindrically curved outer surface 12. Recesses 2 have a dovetail cross section. The guide members 1 are inserted into recesses 2 from the front face of cutter head 3 and abut a stop 5 with their rear surfaces. Elastic elements 4 are inserted in cylindrical bores in one lateral surface of recess 2. The elastic elements extend through the lateral surface and, when the guide members are inserted into the recess, effectively lock the latter into a fixed axial position relative to the cutter head.

Any synthetic material which is relatively rough may be used for implementing the elastic elements. These are preferably cylindrical in shape, the size of the elastic elements relative to that of the cutter head being illustrated in FIG. 3.

Figure 1:
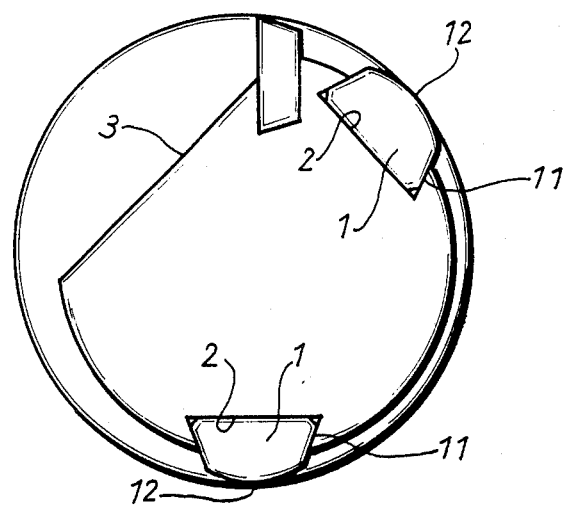
Figure 2:
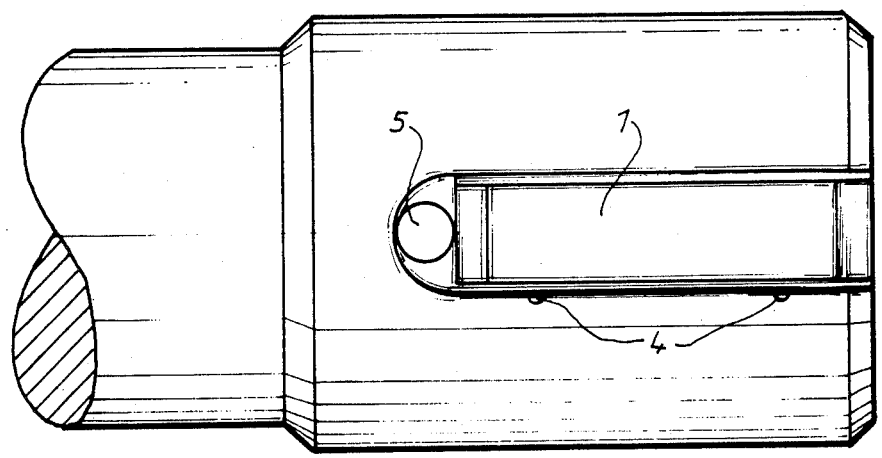
Figure 3:
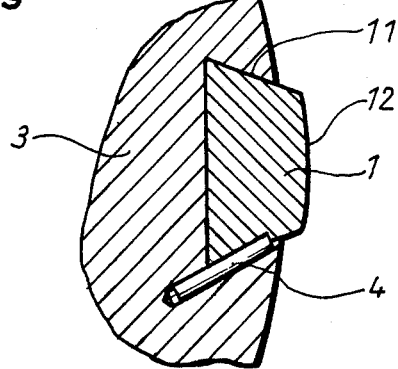

While the invention has been illustrated in preferred embodiments, it is not to be limited to the circuits and structures shown, since many variations thereof will be evident to one skilled in the art and are intended to be encompassed in the present invention as set forth in the following claims.

I claim:

1. In a reamer comprising a cutter head rotating about an axis and at least one elongated guide member, the improvement means comprising means comprising an elongated recess in said cutter head extending in a direction substantially parallel to said axis for self-locking said guide member in a predetermined position relative to said cutter head upon insertion of said guide member in said elongated recess, said elongated recess having a first lateral surface leading said elongated recess in the direction of rotation of said cutter head and further comprising a plurality of elastic elements inserted in said cutter head and passing through said lateral surface to said elongated recess.

2. Apparatus as set forth in claim 1, wherein said elastic elements are arranged in radial planes of said cutter head.

3. Apparatus as set forth in claim 1, wherein said elastic elements are made of a synthetic material.

4. Apparatus as set forth in claim 1, wherein said elastic elements have a minimum diameter of 0.2 mm.

5. Apparatus as set forth in claim 1, wherein said recess is prismatic.

6. Apparatus as set forth in claim 5, wherein said recess has a dovetail profile.

7. Apparatus as set forth in claim 6, wherein said guide member has a substantially trapezoidal cross section, a cylindrical outer surface, a base, and a first and second lateral surface extending from said base to said outer surface.

8. Apparatus as set forth in claim 6, wherein said guide member has a cylindrical outer surface and a first and second lateral surface inclined at a predetermined angle toward one another and gradually changing from a planar to a cylindrical shape in the region adjoing said outer surface.

* * * * *